(12) United States Patent
Jolly et al.

(10) Patent No.: US 10,666,181 B2
(45) Date of Patent: May 26, 2020

(54) MECHANICAL DEVICES AND METHOD OF CREATING PRESCRIBED VIBRATION

(71) Applicant: LORD Corporation, Cary, NC (US)

(72) Inventors: Mark R. Jolly, Raleigh, NC (US); Russell E. Altieri, Holly Springs, NC (US); Askari Badre-Alam, Cary, NC (US); Jonathan M. Owens, Chapel Hill, NC (US); Anthony Gray Hunter, Raleigh, NC (US); Bradley N. Jones, Crestview Hills, KY (US); Brian Carr, Florence, KY (US); Ben Holton, Cincinnati, OH (US); Eric Cady, Florence, KY (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 16/288,647

(22) Filed: Feb. 28, 2019

(65) Prior Publication Data

US 2019/0199262 A1 Jun. 27, 2019

Related U.S. Application Data

(63) Continuation of application No. 14/438,269, filed as application No. PCT/US2013/066500 on Oct. 24, 2013, now abandoned.

(60) Provisional application No. 61/719,084, filed on Oct. 26, 2012.

(51) Int. Cl.
*H02P 25/032* (2016.01)
*B06B 1/16* (2006.01)

(52) U.S. Cl.
CPC .......... *H02P 25/032* (2016.02); *B06B 1/161* (2013.01)

(58) Field of Classification Search
CPC .............................. H02P 25/032; B06B 1/161
USPC .......................................................... 318/114
See application file for complete search history.

(56) References Cited

U.S. PATENT DOCUMENTS

| 3,485,363 | A | 12/1969 | Talley |
| 3,504,793 | A | 4/1970 | Eaton et al. |
| 3,899,414 | A | 8/1975 | Hansen |
| 4,875,999 | A | 10/1989 | Haight |
| 4,950,966 | A | 8/1990 | Moulds, III |
| 4,999,534 | A | 3/1991 | Andrianos |
| 5,226,546 | A | 7/1993 | Janssens et al. |

(Continued)

FOREIGN PATENT DOCUMENTS

| EP | 2310619 | 4/2011 |
| GB | 2331164 | 5/1999 |

(Continued)

*Primary Examiner* — Jorge L Carrasquillo
*Assistant Examiner* — Devon A Joseph
(74) *Attorney, Agent, or Firm* — Jenkins, Wilson, Taylor & Hunt, P.A.

(57) ABSTRACT

The invention provides a system for creating a prescribed vibration profile on a mechanical device comprising a sensor for measuring an operating condition of the mechanical device, a circular force generator for creating a controllable rotating force vector comprising a controllable force magnitude, a controllable force phase and a controllable force frequency, a controller in electronic communication with said sensor and said circular force generator, the controller operably controlling the controllable rotating force vector, wherein the difference between the measured operating condition and a desired operating condition is minimized.

14 Claims, 9 Drawing Sheets

(56) References Cited

U.S. PATENT DOCUMENTS

| | | | |
|---|---|---|---|
| 5,202,824 A | 8/1993 | Chen | |
| 6,513,664 B1 | 2/2003 | Logan et al. | |
| 6,845,868 B1 | 1/2005 | Krush et al. | |
| 8,267,652 B2 * | 9/2012 | Jolly | B64C 27/001 |
| | | | 415/1 |
| 8,485,364 B2 | 7/2013 | Krush et al. | |
| 9,311,425 B2 | 4/2016 | Mahan et al. | |
| 2010/0034655 A1 * | 2/2010 | Jolly | B64C 27/001 |
| | | | 416/145 |
| 2012/0032780 A1 | 2/2012 | Drummond et al. | |
| 2012/0232780 A1 * | 9/2012 | Delson | A63F 13/06 |
| | | | 701/400 |
| 2013/0340791 A1 | 12/2013 | Steiness et al. | |

FOREIGN PATENT DOCUMENTS

| | | |
|---|---|---|
| WO | 9917275 | 4/1999 |
| WO | 0039480 | 7/2000 |
| WO | 0058033 | 10/2000 |

\* cited by examiner

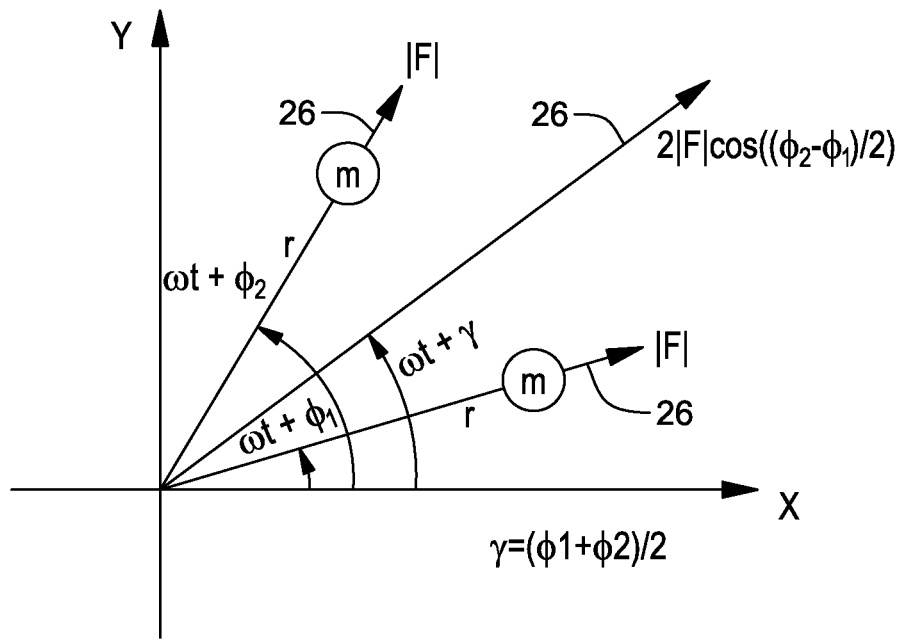
FIG. 8A
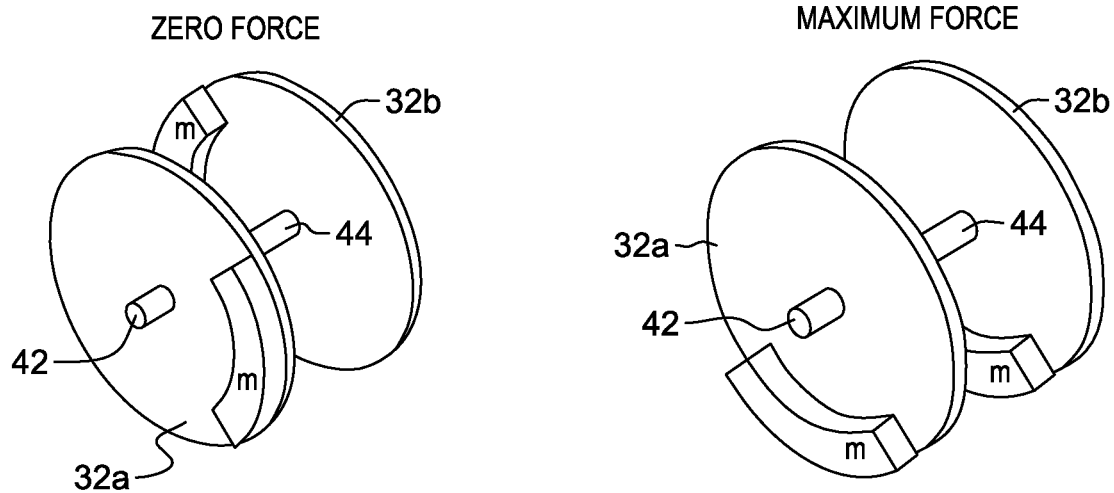
FIG. 8B
FIG. 8C

MECHANICAL DEVICES AND METHOD OF CREATING PRESCRIBED VIBRATION

CROSS REFERENCE TO RELATED APPLICATION

This Application is a continuation of co-pending U.S. patent application Ser. No. 14/438,269 filed on Apr. 24, 2015, which was the National Stage of International Application No. PCT/US2013/066500, filed Oct. 24, 2013, which claims the benefit of U.S. Provisional Application No. 61/719,084, filed Oct. 26, 2012, to which the benefit of all is claimed and all of which are incorporated by referenced.

BACKGROUND

Some mechanical devices perform specific functions through use of induced vibratory motion. Such devices include may be used to provide services such as monitoring damage detection and structural assessment of civil structures and mechanical devices, damping in civil structures, searching for oil and gas with seismic impulse exciters, and medical devices. Such devices may also include equipment for controlling fluid flow in a pipe, deliquifying screens, and equipment that functions as material separators, vibratory feeders and conveyors, attrition mills, mold shakeout machines, and vibratory compactors. Typically, these devices utilize one or more force generators to create a predefined force profile suitable for inducing a desired vibration within the device. These force generators may include linear drives or imbalanced rotors driven by synchronous motors or induction motors whose speed is an integer fraction of the electrical source frequency. To vary the frequency of vibration, variable frequency drives (VFDs) are used in conjunction with these motors. To tailor the shape of the vibration profile or create a resonance for the purpose of amplifying the vibration response, springs, stabilizers, and/or mechanical pivots are used. When multiple synchronous or asynchronous motors are used on the same device and are coupled through common base vibration, they tend to synchronize with each other to produce a consistent and predesigned force profile.

The aforementioned devices are incapable of maintaining a desired vibration profile for the mechanical device when operating conditions change (e.g., changes in material loading, changes in temperature, changes in material properties, or other variables that can alter the response of the mechanical device). In some cases, the aforementioned devices cannot create certain desirable vibration profiles. In other cases, the aforementioned devices cannot create a variety of selectable vibration profiles within limits imposed by the authority of their respective force generators.

SUMMARY OF THE INVENTION

In accordance with the present invention a system for creating a prescribed operating function within a mechanical device. The system comprises a mechanical device, at least one circular force generator (CFG), at least one sensor and a controller. The CFG is affixed to the mechanical device. The CFG is capable of producing a rotating force vector, wherein the rotating force vector includes a magnitude, a phase, and a frequency, wherein the CFG creates at least one vibration profile in the mechanical device. The at least one sensor is positioned on the mechanical device, wherein the sensor measures an operating function associated with and enabled by the vibration profile. The controller is in electronic communication with the sensor and with the CFG, the controller operably controlling the force vector based upon the measurement of the operating function, wherein the magnitude, phase and frequency are independently controllable by the controller, wherein the controller changes the force vector. Wherein a difference between the measured operating function and a prescribed operating function is reduced.

In accordance with the present invention a system for creating a prescribed vibration profile within a mechanical device. The system comprises a mechanical device, at least one circular force generator (CFG), at least one sensor and a controller. The CFG is affixed to the mechanical device. The CFG is capable of producing a rotating force vector, wherein the rotating force vector includes a magnitude, a phase, and a frequency, wherein the CFG creates at least one vibration profile in the mechanical device. The at least one sensor is positioned on the mechanical device, wherein the sensor measures a vibration profile associated with and enabled by the vibration profile. The controller is in electronic communication with the sensor and with the CFG, the controller operably controlling the force vector based upon the measurement of the vibration profile, wherein the magnitude, phase and frequency are independently controllable by the controller, wherein the controller changes the force vector. Wherein a difference between the measured vibration profile and a prescribed vibration profile is reduced.

In another aspect, the invention provides for a method for creating a prescribed operating function on a mechanical device having at least one CFG capable of producing a rotating force vector with a controllable magnitude, phase and frequency, a sensor and a controller, and the CFG is capable of creating at least one vibration profile in the mechanical device, the method comprising the steps of:
(a) defining a prescribed operating function;
(b) measuring an operating function with the sensor;
(c) communicating the measured operating function from the sensor to the controller;
(d) calculating an error by comparing the measured operating function to the desired operating function;
(e) processing the error in the controller using an algorithm, wherein the processing produces a command for the CFG, the command including changes to the magnitude, the phase, and/or the frequency of the rotating force vector;
(f) communicating the changes to the force vector to the CFG such that the difference between the measured operating function and the prescribed operating function is reduced.

Disclosed herein is a system for comparing a vibration profile of a mechanical device to a prescribed vibration profile for the mechanical device. The system includes a mechanical device with at least one sensor and at least a first CFG affixed thereto. The CFG is configured to produce the vibration profile of the mechanical device and the sensor is configured to monitor the vibration profile of the mechanical device. The system also includes a controller in electronic communication with the sensor and with the first CFG. Stored within the controller is a prescribed vibration profile for the mechanical device. The controller is configured to receive a signal from the sensor and is also configured to determine the vibration profile of the mechanical device. Additionally, the controller is configured to compare the vibration profile of the mechanical device to the prescribed vibration profile stored within the controller and to determine the difference between the prescribed vibration profile and the vibration profile of the mechanical device Also disclosed is a system for comparing a vibration profile of a mechanical device to a prescribed vibration profile for the mechanical device. The system includes a mechanical device with at least one sensor and at least a first CFG affixed thereto. The CFG is configured produce the vibration profile of the mechanical device and the sensor is configured to monitor the vibration profile of the mechanical device. The system also includes a controller in electronic communication with the sensor and with the first CFG. Stored within the controller is at least one prescribed vibration profile stored within the controller. The controller is configured to receive a signal from the sensor and use the signal to determine the vibration profile of the mechanical device. The controller is further configured to compare the vibration profile of the mechanical device to the prescribed vibration profile stored within the controller and determine the difference between the prescribed vibration profile and the vibration profile of the mechanical device. Finally, the controller is configured to change the operation of the first CFG to increase or decrease the vibration profile of the mechanical device to reduce the difference between the vibration profile of the mechanical device and the prescribed vibration profile.

Still further is disclosed a method for adjusting a vibration profile of a mechanical device. The method comprises the steps of:
(a) positioning a sensor on the mechanical device;
(b) affixing a first CFG to the mechanical device, the CFG configured to produce a rotating vector force, the rotating vector force includes a magnitude, a phase and a frequency;
(c) using the CFG to induce the vibration profile in the mechanical device;
(d) using the sensor to measure the vibration profile of the mechanical device;
(e) providing a controller, the controller in electronic communication with the sensor and the CFG;
(f) storing a prescribed vibration profile for the mechanical device within the controller;
(g) continuing to operate the CFG while using the controller to monitor the sensor and generate the vibration profile of the mechanical device corresponding to an operating condition of the mechanical device and CFG;
(h) using the controller to determine the difference between the vibration profile of the mechanical device as measured by the sensor and the prescribed vibration profile; and,
(i) using the controller to change the operation of the CFG to produce a change in at least one of the CFG's magnitude, phase or frequency thereby producing a change in the vibration profile of the mechanical device to reduce the difference between the vibration profile of the mechanical device and the prescribed vibration profile.

Numerous objects and advantages of the invention will become apparent as the following detailed description of the preferred embodiments is read in conjunction with the drawings, which illustrate such embodiments.

BRIEF DESCRIPTION OF THE DRAWINGS

FIGS. 8A-C illustrate force generation using two co-rotating imbalanced rotors to create a circular force with controllable magnitude and phase, thereby providing a CFG.

DETAILED DESCRIPTION

The invention described herein is applicable to a wide range of devices where a mechanically induced vibration is desired, the non-limiting examples of vibratory deliquifying machines, conveyors, and separators are used for illustration purposes.

Figure 1:
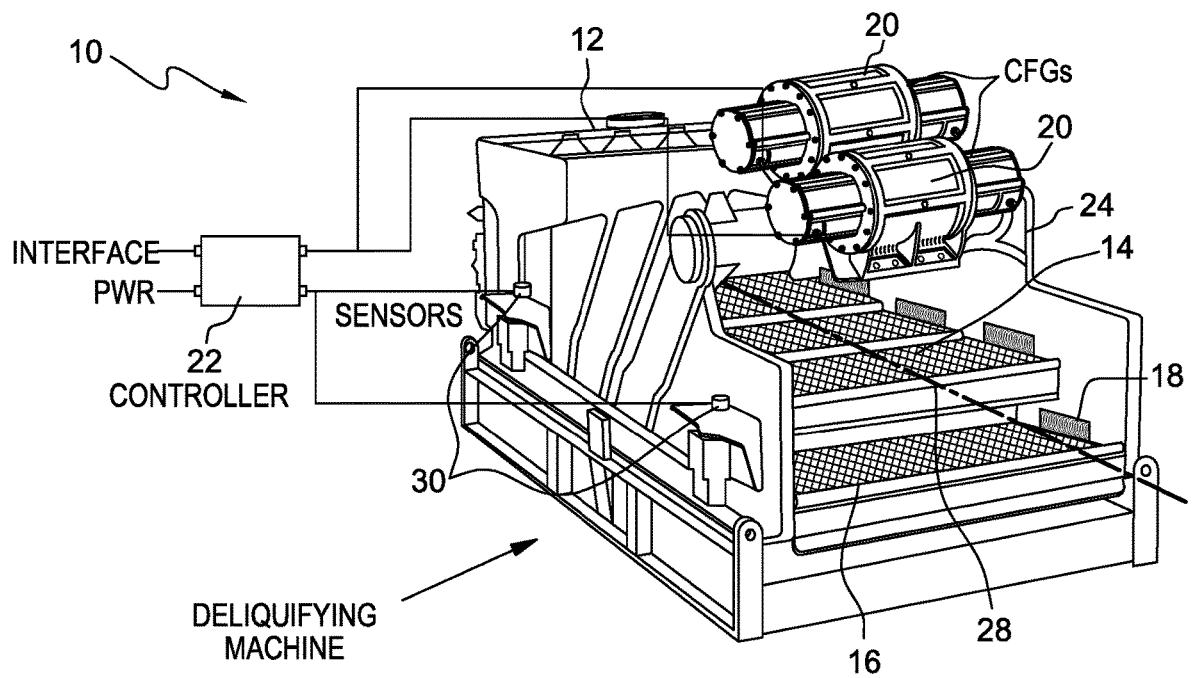
FIG. 1 illustrates a perspective view of a deliquifying screen with circular force generators positioned thereon.

Referring to the drawings, FIG. 1 shows the invention as applied to the non-limiting example of a vibratory deliquifying machine illustrated and generally designated by the numeral 10. The non-limiting example vibratory deliquifying machine 10, as illustrated, includes inlet 12, screen 14, exit 16, springs 18, and force generators 20. Force generators 20 are preferably CFG 20.

In vibratory deliquifying machine 10, slurries (not shown) enter inlet 12 where a vibratory motion causes the slurry to convey across screen 14 suspended on springs 18. As the slurry is conveyed across screen 14, liquid passes through screen 14 while dry material (not shown) is extracted at exit 16.

Existing vibratory deliquifying machines have a specific elliptical vibratory motion at one specific frequency. Incorporation of CFG 20 and controller 22, enables the use of a prescribed elliptical vibratory motion for optimal performance of deliquifying machine 10. In the case of the non-limiting example of vibratory deliquifying machine 10, the prescribed elliptical vibratory motion from CFGs 20 provides improved separation of liquid and solid matter. Additionally, management of CFG 20 by controller 22 enables the maintenance of the optimal vibratory motion even when the mass of the slurry or the center-of-gravity of the slurry on screen 14 changes with time or operating condition.

In FIG. 1 two, CFGs 20 are mounted to screen structure 24 of vibratory deliquifying machine 10. Referring to FIGS. 8A-8C for CFG 20, each CFG 20 is capable of creating rotating force vector 26 having a controllable magnitude $F_0$, a controllable phase $\varphi$, and a controllable frequency $\omega$. In FIGS. 1 and 8A-8C, when two CFGs 20 operate proximal to one another and at the same frequency $\omega$, one CFG 20 is arranged to produce a clockwise rotating force vector and the other CFG 20 is arranged to produce a counter clockwise rotating force vector. The resultant force is a controllable two degree-of-freedom planar force. These applied forces act on screen structure 24 and produce an induced vibratory motion.

In the non-limiting example illustrated in FIG. 1, CFGs 20 are mounted on centerline 28 of vibratory deliquifying machine 10. This placement avoids creating a side-to-side rocking motion from applied forces. Screen structure 24 is assumed to be a rigid body, whereby the two proximal CFGs 20 create two degrees-of-freedom of controllable planar motion. The addition of more CFGs 20 will increase the degrees-of-freedom of controllable motion. For example, the application of a third CFG 20 will allow for three degrees-of-freedom of controllable planar motion. The maximum of six CFGs 20 will allow for a full six degrees-of-freedom rigid body control of motion. Depending upon the need, two-to-six CFGs 20 are utilized on a rigid body to create controllable motion from two to six two degrees-of-freedom, respectively.

In the non-limiting example of vibratory deliquifying machine 10 illustrated in FIG. 1, sensors 30 are used to provide input to controller 22. Sensors 30 are applied to the screen structure 24. The location of sensors 30 is determined by the particular data element being sensed. Sensors 30 monitor an aspect of vibratory deliquifying machine 10 performance related to the induced vibratory motion.

The signals from sensors 30 are received by controller 22. Controller 22 commands the force magnitude, phase, and frequency of each CFG 20. Within controller 22 resides at least one algorithm comparing performance, as measured by sensors 30, with a desired performance, i.e. a desired vibration profile, to produce an error. The algorithm then produces CFG commands that that will reduce or minimize this error. Many methods are known to those skilled in the art for reducing an error based on sensor 30 feedback, including various feedback control algorithms, open-loop adaptive algorithms, and non-adaptive open-loop methods. In one exemplary embodiment, controller 22 uses a filtered-x least mean square (Fx-LMS) gradient descent algorithm to reduce the error. In another exemplary embodiment, the controller uses a time-average gradient (TAG) algorithm to reduce the error.

Sensors 30 include all types of vibration sensors, including digital, analog, and optical. Sensors 30 also include accelerometers, thermocouples, infrared sensors, mass flow rate sensors, particle matter sensors, load sensors and optical sensors. Additionally, sensors 30 may be selected from the group consisting of vibration sensors, accelerometers, thermocouples, infrared sensors, mass flow rate sensors, particle matter sensors, load sensors, optical sensors and combinations thereof. A plurality of sensors 30 of the same type or a plurality of different types of sensors 30 are employed to maximize the measurement of the operating condition.

The mechanical devices contemplated herein perform specific operating functions through use of induced vibratory profiles. Operating functions include material flow or movement, material separation, material compaction, drying, pumping, as well as others. All of the operating functions are enabled by the induced vibratory profile and react to vibratory input from CFGs 20.

Figure 2:
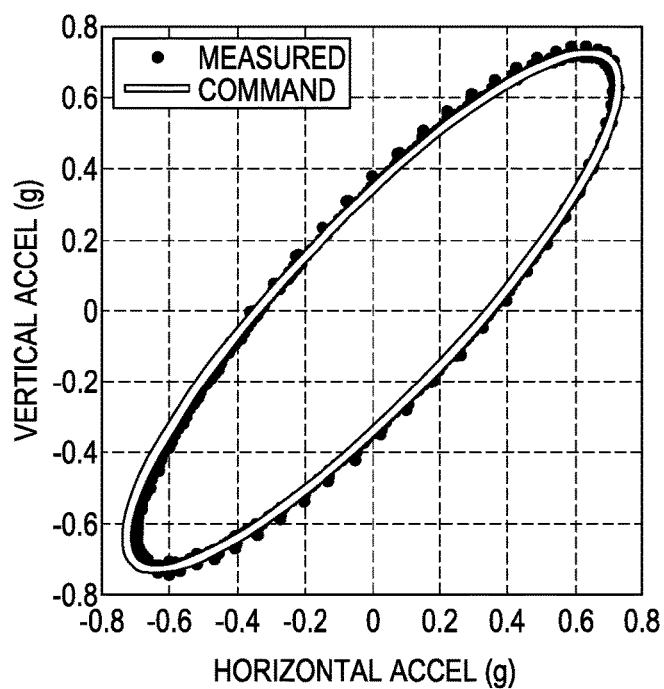
FIG. 2 illustrates a typical vibration prescribed vibration profile enabled by the present invention.

In an exemplary embodiment, sensors 30 are accelerometers directly measuring the operating function of screen structure 24. In this non-limiting embodiment, the operating condition measured is the vibration profile of screen structure 24. Within controller 22 the measured operating function, i.e. vibration profile, is compared with a desired or prescribed vibration profile to produce an error. Controller 22 then implements an algorithm that produces CFG commands such that the measured operating function moves toward the prescribed vibration profile reducing the error. By way of illustration, FIG. 2 shows both a prescribed vibration profile (labeled as "Command") and a measured vibration profile, i.e. operating function, as measured by a biaxial accelerometer located near the center-of-gravity of the screen assembly. In FIG. 2 the prescribed vibration profile is illustrated as a solid line and labeled as "Command," and the measured vibration profile is illustrated as a dotted line and labeled as "Measured." It can be seen that the difference, or error, between these profiles is small.

Figure 3:
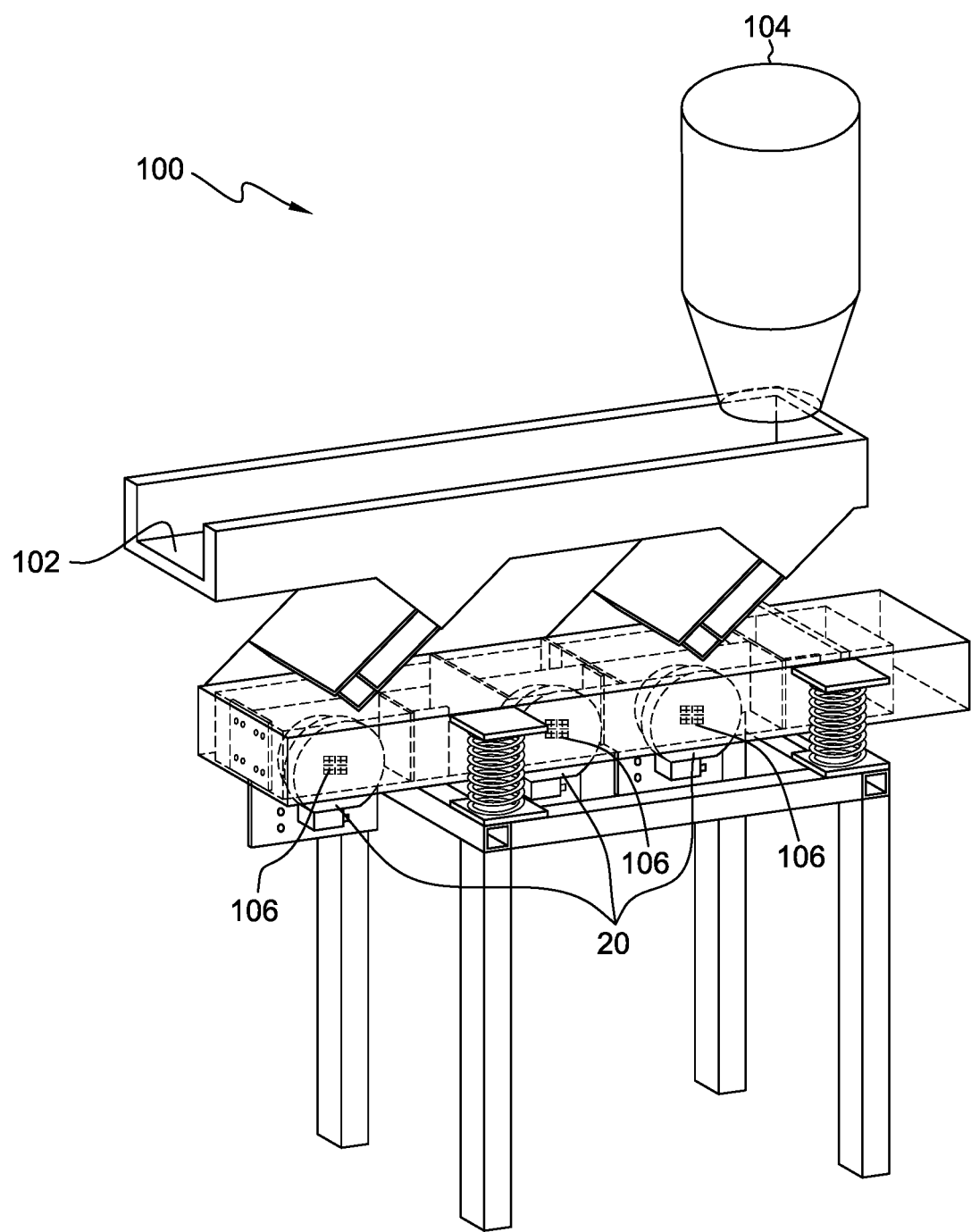
FIG. 3 illustrates a perspective view of a vibratory conveyor with circular force generators positioned thereon.

In another illustrative non-limiting example, FIG. 3 shows the present invention applied to vibratory feeder 100. Material is fed onto feeder bed 102 of vibratory feeder 100 from hopper 104. Vibratory motion conveys the material along feeder bed 102 where it is then metered into another machine, or a package, or any one of a number of secondary systems.

Application of the present invention enables a prescribed elliptical vibratory motion for optimal performance of vibratory feeder 100. Optimal performance includes precision metering of material flow or high material conveyance rate without damaging or dispersing the material. The present invention also enables the maintenance of the optimal vibratory motion even when the mass of the material on feeder bed 102 or the center-of-gravity of the material on feeder bed 102 changes with time or operating condition. In other embodiments or other uses the prescribed vibration is selected from the group consisting of linear, elliptical and orbital, as determined by the desired outcome.

Vibratory feeder 100 illustrated in FIG. 3 is used similarly to the application to vibratory deliquifying machine 10 described hereinabove and illustrated in FIGS. 1 and 2. Feedback sensors 106 shown are accelerometers, but may be sensors 106 that directly or indirectly measure material flow rate. By way of non-limiting example, sensors 106 shown in FIG. 3 are embedded within CFG 20 thereby eliminating extra connectors and wiring harnesses associated therewith.

Figure 4:
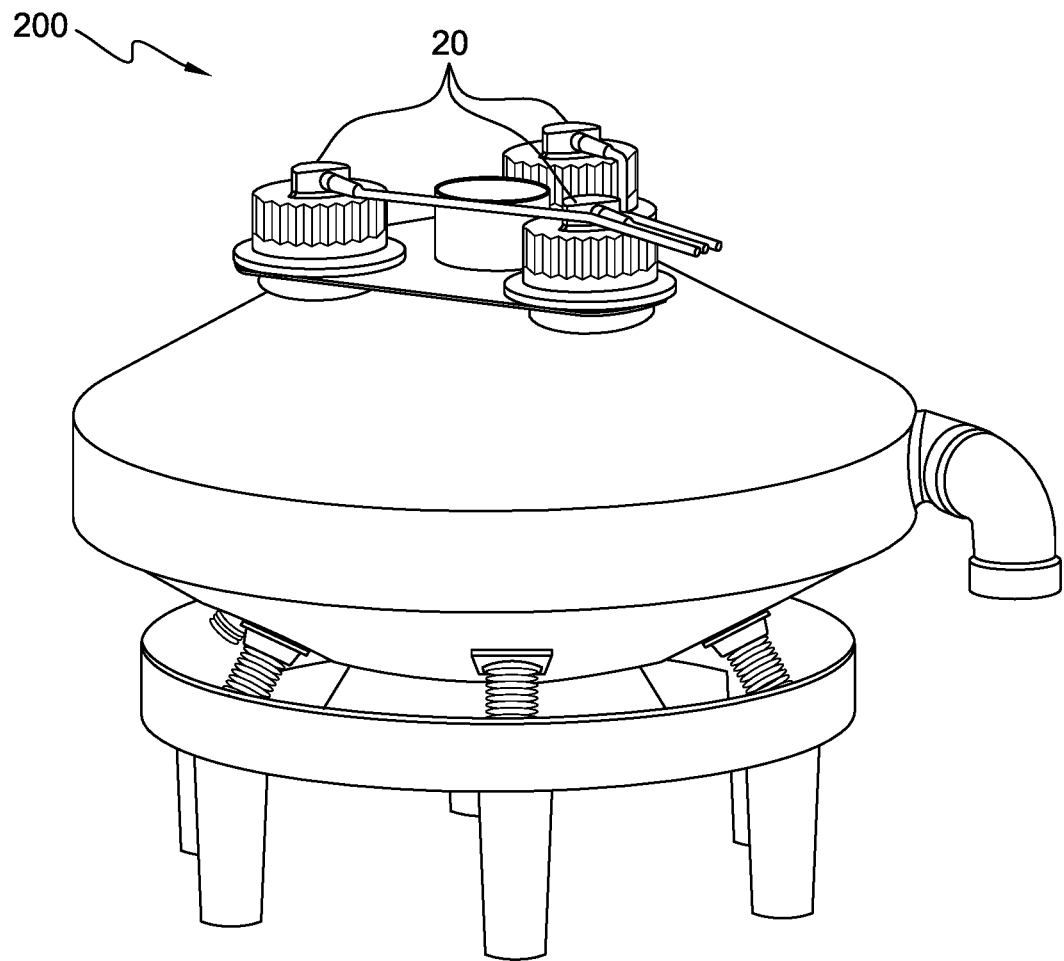
FIG. 4 illustrates a perspective view of a vibratory material separator with circular force generators positioned thereon.

Referring to FIG. 4 vibratory material separator 200 is illustrated as another non-limiting example. Vibratory material separator 200, as illustrated, uses screens (not shown) and induced vibratory motion to separate granular materials or aggregates based on grain size and/or density. Using prescribed vibratory motion generated by CFGs 20, the performance of material separators is optimized. Optimal performance includes improving separation, or improving throughput, or a combination thereof. Optimal performance also includes enhancement of the screen life and anti-fouling of the screen. The optimal vibratory motion is maintained even when the mass of the material or the center-of-gravity of the material within vibratory material separator 200 changes with time or operating condition. The application of the present invention to vibratory material separator 200 illustrated in FIG. 4 is very similar to the application to previous examples described hereinbefore.

Figure 5A:
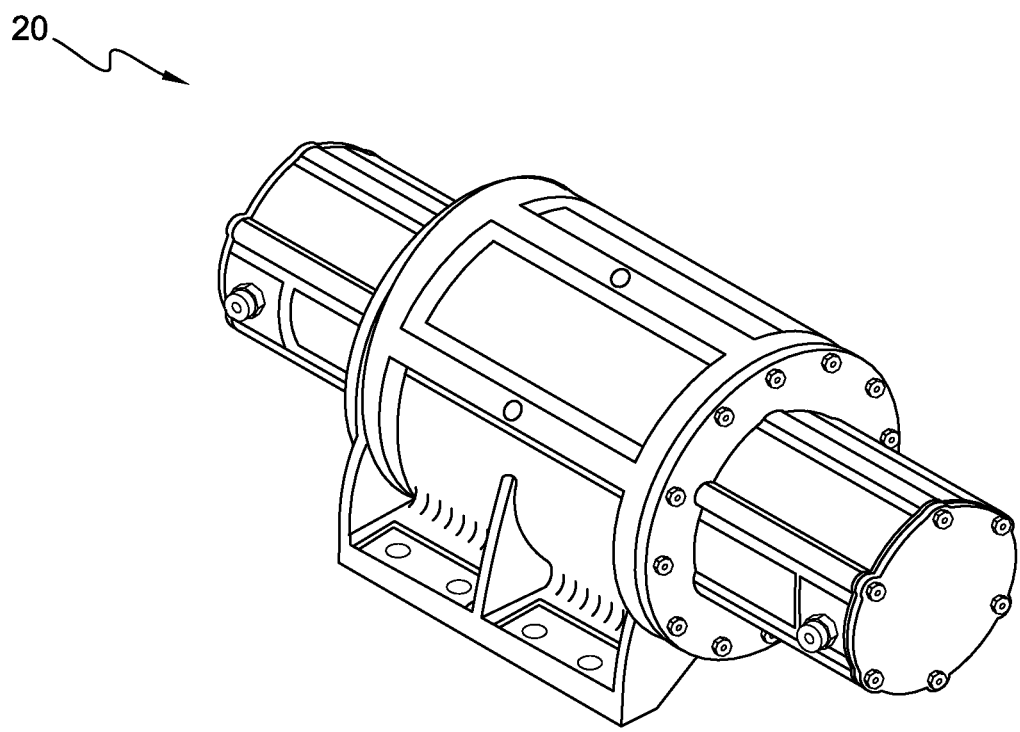
FIG. 5A illustrates one embodiment of a Circular Force Generator (CFG).
Figure 5B:
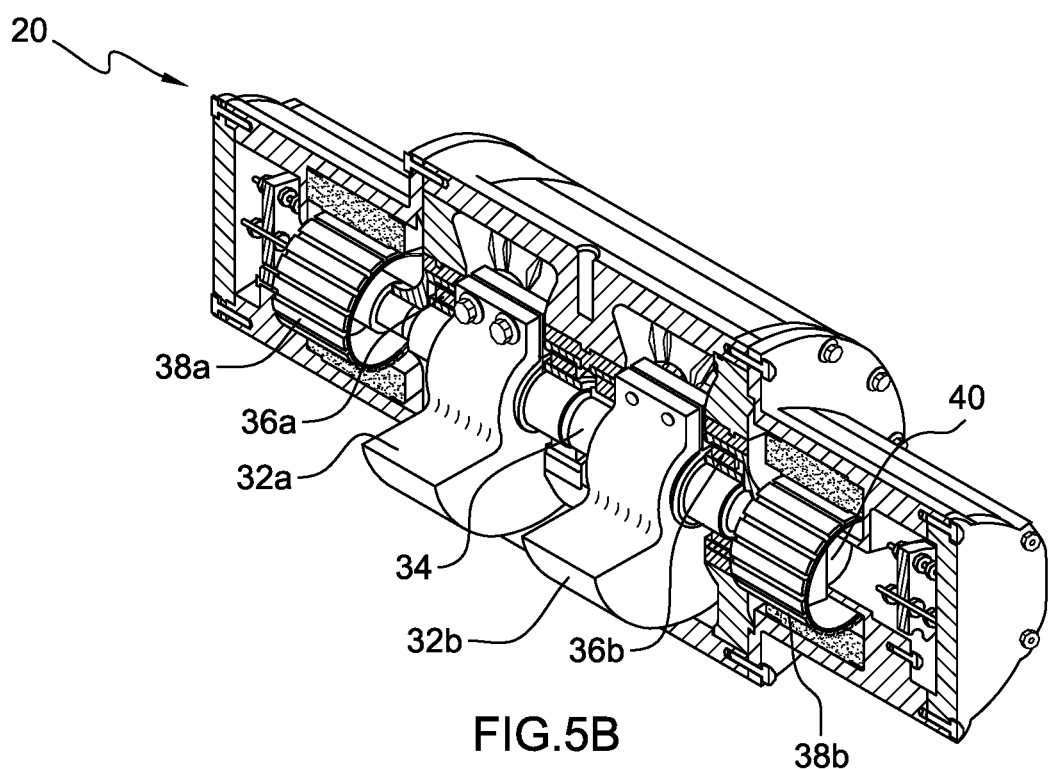
FIG. 5B illustrates a partial cut-away view of the CFG of FIG. 5A.
Figure 6:
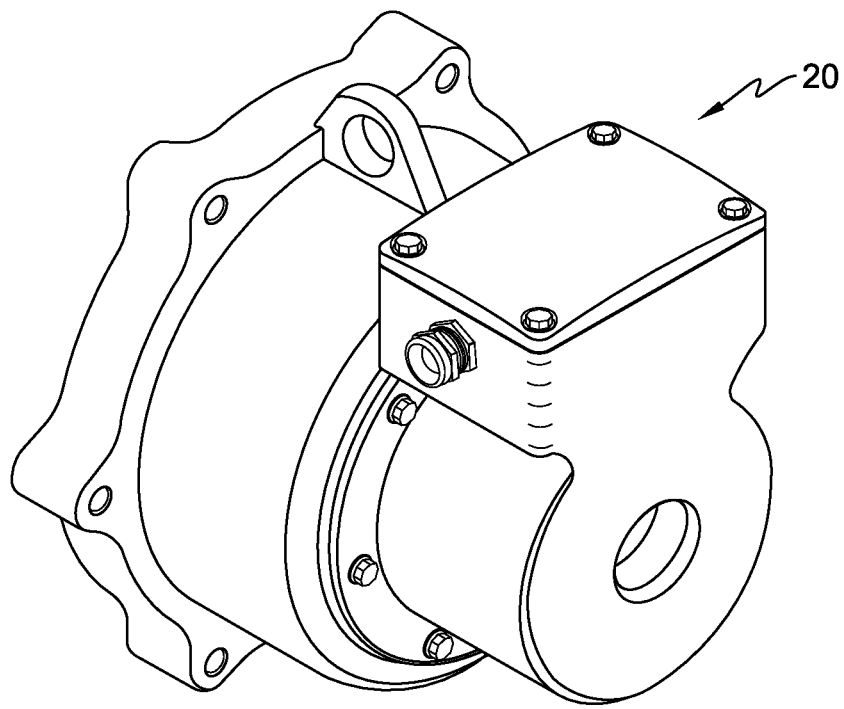
FIG. 6 illustrates another embodiment of a CFG. In this case the CFG comprises two separate identical components, one of which is shown.
Figure 6:
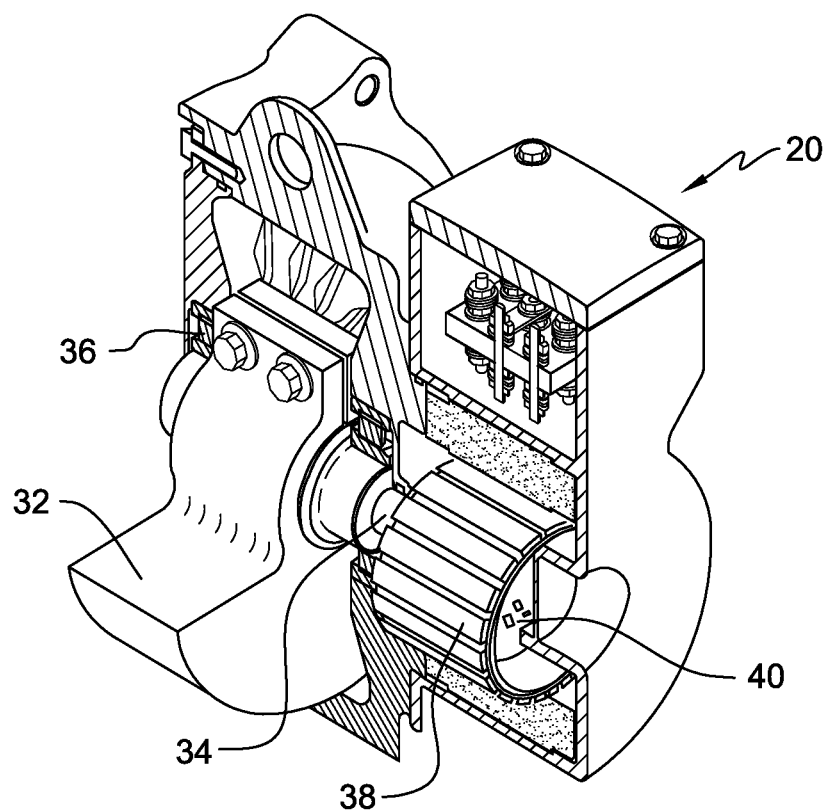

FIGS. 5A-8C provide non-limiting examples of CFG 20 in different variations. Referring to FIGS. 5A-6, CFG 20 consists of two imbalanced masses 32a, 32b each attached to a shaft 34 and each suspended between two rolling element bearings 36a, 36b. Each imbalance mass 32a, 32b is driven by motor 38a, 38b. In exemplary embodiments, the two motors 38a, 38b within CFG 20 are brushless permanent magnet motors, sometimes called servo motors. Each motor 38a, 38b includes a sensor 40 for sensing the rotary position of imbalanced masses 32a, 32b. Within the aforementioned controller 22, an algorithm employing Equation (1) that receives the rotary position sensor feedback, and uses common servo motor control techniques controls the rotary position $\theta$ of each motor. The equation employed is illustrated by Equation (1):

$$\theta(t)=\omega t+\phi \quad \text{Equation (1)}$$

where ω is the rotational speed and φ is the rotational phase. Rotational phase φ corresponds to the phase of the motor (and thus the imbalanced mass) with respect to an internal reference tachometer signal. Both imbalanced masses 32a, 32b co-rotate at nominally the same speed co, and each imbalanced mass 32a, 32b creates a centrifugal force whose magnitude is mathematically determined by using Equation (2):

$$|F|=mr\omega^2 \quad \text{Equation (2)}$$

where mr is the magnitude of imbalanced mass 32a, 32b which is typically expressed in units of Kg-m. The phase of the first imbalanced mass 32a with respect to the second imbalanced mass 32b (i.e., the relative phase) within CFG 20 will determine the magnitude of resultant rotating force vector 26.

Referring to FIGS. 8A-C, a zero-force case and a full-force case of imbalance masses 32a and 32b of CFG 20 are both illustrated. In the zero-force case the relative phase $\varphi_2-\varphi_1$ is 180 degrees and resulting force rotating vector 26 has a magnitude of zero. In the full-force case, the relative phase $\varphi_2-\varphi_1$ is 0 degrees and resulting rotating force vector 26 has a maximum magnitude of 2|F|. For relative phases $\varphi_2-\varphi_1$ between 0 and 180 degrees, the magnitude of resulting rotating force vector 26 will be between zero and maximum. Furthermore, the collective phase y of rotating force vector 26 can be varied to provide phasing between CFGs 20. Through control of phase f of each imbalance mass 32a, 32b the magnitude and absolute phase of the rotating force vector 26 produced by CFG 20 can be controlled.

Referring to FIGS. 1-8C, the particular structure carrying CFGs 20 includes n vibration sensors 30 and m CFGs 20, wherein n≥m and (with m being a whole number equal to or greater than one). Controller 22 detects at least one vibration signal from at least one vibration sensor 30, the vibration signal providing a magnitude, a phase, and a frequency of the detected vibration. Controller 22 generates a vibration reference signal from the detected vibration data and correlates it to the relative vibration of the particular structure carrying CFGs 20 relative to the CFGs 20.

Preferably, the first CFG 20 includes the first imbalance mass 32a controllably driven about a first mass axis 42 with a first controllable imbalance phase $\varphi_1$ and a second imbalance mass 32b controllably driven about a second mass axis 44 with a second controllable imbalance phase $\varphi_2$, the first controllable imbalance phase $\varphi_1$ and the imbalance phase $\varphi_2$ controlled in reference to the vibration reference signal. The $m^{th}$ CFG 20 includes a first imbalance mass ($mass_{m\_1}$) 32a controllably driven about a first mass axis 42 with a first controllable imbalance phase and a second imbalance mass 32b controllably driven about a second mass axis 44 with a second controllable imbalance phase, the imbalance phase and the imbalance phase controlled in reference to the vibration reference signal. The vibration reference signal is typically an artificially generated signal within the controller and is typically a sine wave at the desired operational frequency Referring to FIGS. 5A-8, CFG 20 includes a first imbalance mass 32a with a first controllable imbalance phase $\varphi_1$ and a second imbalance mass 32b with a second controllable imbalance phase $\varphi_2$. The first imbalance mass 32a is driven with first motor 38a and second imbalance mass 32b is driven with second motor 38b.

Figure 7:
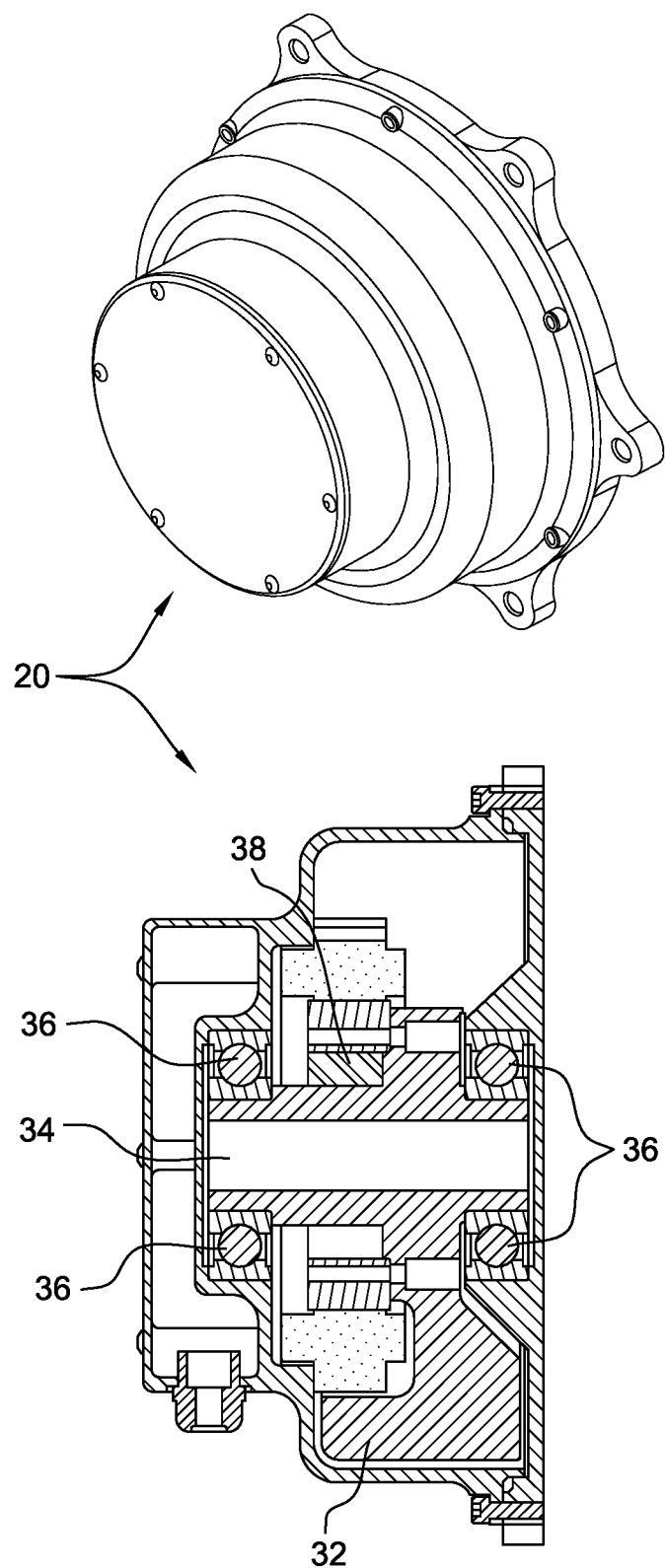
FIG. 7 illustrates yet another embodiment of a CFG. In this case the CFG comprises two separate identical components, one of which is shown.
Figure 9:
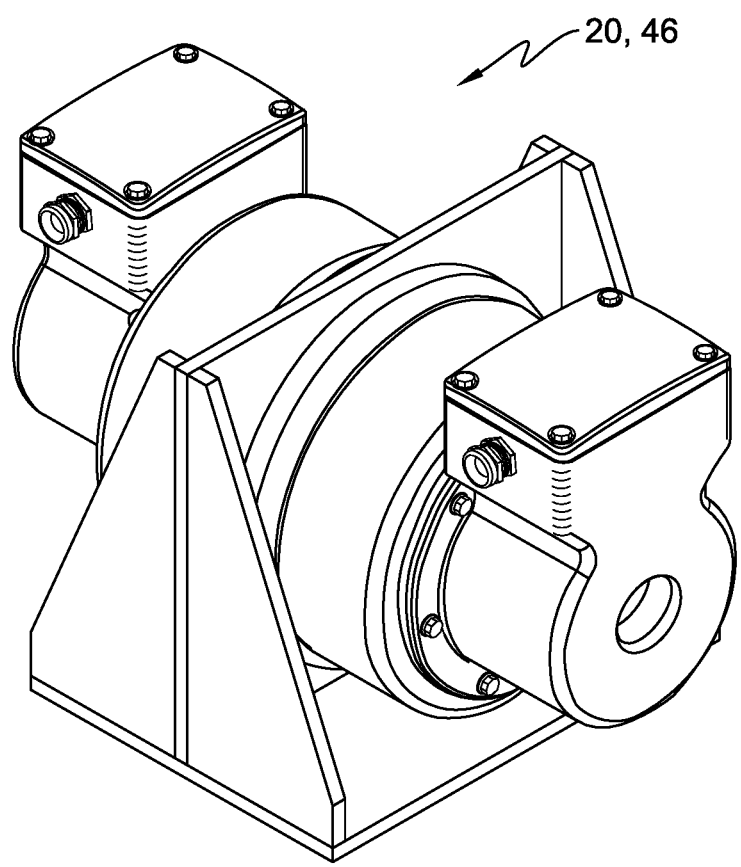
FIG. 9 illustrates two CFGs coaxial mounted on both sides of a mounting plate.
Figure 10:
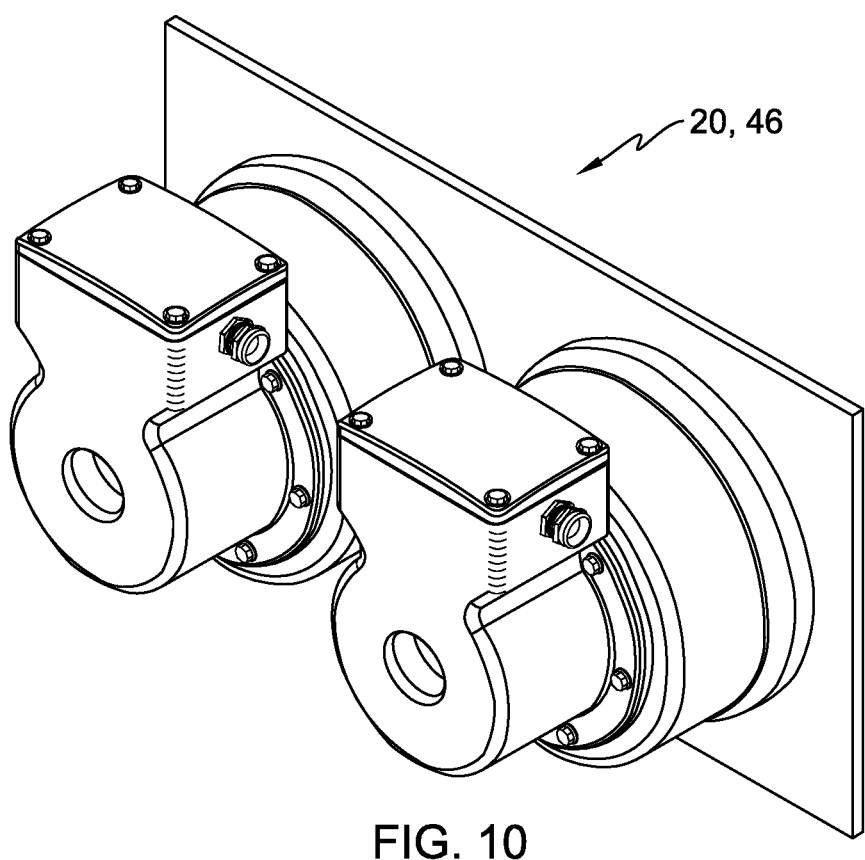
FIG. 10 illustrates two CFGs mounted side-by-side on a mounting plate.

Referring to FIGS. 6 and 7, an embodiment implementing CFG 20 as two identical, but separate, units 46 is illustrated. Each unit 46 contains a single imbalanced mass 32 driven by a single motor 38. By positioning the two units 46 in close proximity, the functionality of CFG 20 is achieved. FIGS. 6 and 7 show additional embodiments of CFG 20. In these figures, only one of two units 46 comprising CFG 20 is shown. The same basic elements previously described are identified in the embodiments shown in FIGS. 6 and 7. Two units 46 may be applied to a mechanical device in proximity to one another to enable CFG 20. For example, two units 46 may be applied coaxially on either side of mounting plate to enable CFG 20 as illustrated in FIG. 9. In another example illustrated in FIG. 10, two units 46 are mounted non-coaxially side-by-side to enable CFG 20.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A system for comparing a vibration profile of a mechanical device to a prescribed vibration profile for the mechanical device comprising:
   a mechanical device with at least one sensor and at least a first circular force generator (CFG) affixed thereto, the first CFG configured to create a controllable rotating force vector comprising a controllable force magnitude, a controllable force phase and a controllable force frequency thereby producing the vibration profile of the mechanical device and the sensor configured to monitor the vibration profile of the mechanical device;
   a controller in electronic communication with the sensor and with at least the first CFG;
   the controller configured to receive a signal from the sensor and configured to determine and adjust the vibration profile of the mechanical device;
   a prescribed vibration profile pre-stored within the controller;
   the controller configured to compare the vibration profile of the mechanical device to the prescribed vibration profile stored within the controller and to determine a difference between the prescribed vibration profile and the vibration profile of the mechanical device, wherein the controller commands the first CFG to increase or decrease the controllable rotating force vector thereby increasing or decreasing the vibration profile so as to reduce the determined difference between the prescribed vibration profile and the vibration profile of the mechanical device, wherein the controller continues to repeat the commands to the first CFG to increase or decrease the controllable rotating force vector thereby increasing or decreasing the vibration profile so as to further reduce the determined difference.

2. The system of claim 1, wherein the sensor is selected from the group consisting of: vibration sensors, accelerometers, load sensors and optical sensors.

3. The system of claim 1, wherein the sensor is a plurality of accelerometers.

4. The system of claim 1, wherein the prescribed vibration profile is an elliptical vibratory motion at a specific frequency.

5. The system of claim 1, wherein the prescribed vibration profile is selected from the group consisting of linear, elliptical and orbital motions.

6. The system of claim 1, wherein the controller is configured to independently control the magnitude, the phase and the frequency of the rotating force vector produced by the first CFG.

7. The system of claim 1, further comprising a second CFG, the second CFG configured to operate at the same frequency as the first CFG.

8. The system of claim 7, wherein the first CFG is configured to produce the rotating force vector in a clockwise direction and the second CFG is configured to produce the rotating force vector in a counter clockwise direction, wherein the combination of the two rotating force vectors produce a resultant biaxial force vector.

9. The system of claim 1, where the mechanical device is selected from the group consisting of a vibratory conveyor, a vibratory feeder, a vibratory separator, a material separator, an attrition mill, a mold shakeout machine, a vibratory compactor, and a seismic impulse exciter.

10. A method for adjusting a vibration profile of a mechanical device, comprising:
positioning a sensor on the mechanical device;
affixing a first circular force generator (CFG) to the mechanical device, the first CFG configured to produce a rotating vector force, the rotating vector force includes a magnitude, a phase and a frequency;
using the first CFG to induce the vibration profile in the mechanical device;
providing a controller, the controller in electronic communication with the sensor and the CFG;
pre-storing a prescribed vibration profile for the mechanical device within the controller;
using the sensor to measure the vibration profile of the mechanical device;
continuing to operate the CFG while using the controller to monitor the sensor and generate the vibration profile of the mechanical device corresponding to an operating condition of the mechanical device and CFG;
using the controller to determine a difference between the vibration profile of the mechanical device as measured by the sensor and the prescribed vibration profile;
using the controller to command the first CFG to increase or decrease at least one of the CFG's magnitude, phase or frequency thereby increasing or decreasing the vibration profile of the mechanical device so as to reduce the difference between the vibration profile of the mechanical device and the prescribed vibration profile;
continuously monitoring the sensor to continuously generate the vibration profile of the mechanical device to determine any changes in the operating condition of the mechanical device;
continuously using the controller to determine the difference between the vibration profile of the mechanical device and the prescribed vibration profile; and
continuously using the controller to change the operation of the CFG to increase or decrease the vibration profile of the mechanical device to reduce the difference between the vibration profile of the mechanical device and the prescribed vibration profile.

11. The method of claim 10, wherein the prescribed vibration profile is an elliptical vibratory motion at a specific frequency.

12. The method of claim 10, further comprising:
affixing a second CFG to the mechanical device, wherein the first CFG is configured to produce the rotating force vector in a clockwise direction and the second CFG is configured to produce the rotating force vector in a counter clockwise direction;
using the controller to manage the operation of the first CFG and the second CFG to produce a resultant force vector that is controllable in two degree-of-freedom and the resultant force vector is the combination of the force vector produced by the first CFG and the force vector produced by the second CFG.

13. The method of claim 10, where the mechanical device is selected from the group consisting of an aircraft engine, a rotary wing aircraft hub, a propeller hub, and a landing craft fan hub.

14. The method of claim 10, further comprising the step of: continuing to operate the CFG while using the controller to monitor the sensor and generate the vibration profile of the mechanical device corresponding to an operating condition of the mechanical device and CFG.

* * * * *